United States Patent Office 3,837,992
Patented Sept. 24, 1974

3,837,992
LAMINATED ARTICLE
James Webster Sherman, Richmond, Ind., and Ronald Buxton Raab, Perrysburg, Ohio, assignors to Johns-Manville Corporation, New York, N.Y.
Filed Nov. 24, 1971, Ser. No. 201,895
Int. Cl. B32b 15/02
U.S. Cl. 161—89
1 Claim

ABSTRACT OF THE DISCLOSURE

A faced substrate in which the facing is a composite sheet having its components bonded by a film adhesive which also bonds the facing to the substrate. The composite facing is formed by continuously advancing the component layers of the facing to a point of convergence where heat and pressure are applied to adhesively bond the layers with the film adhesive into a facing having the adhesive exposed at one face and subsequently applying the facing with an orientation presenting the exposed adhesive to a substrate to which it is to be applied. In a line process the facing and substrate are advanced to a point of convergence where heat and pressure are again applied to adhesively bond the facing to the substrate with the same film adhesive.

BACKGROUND OF THE INVENTION

There are many products upon which facings can be applied advantageously. For example, liquid impervious facings form barriers against moisture, gas impervious facings are frequently used to advantage on thermal insulation. A smooth protective surface or increased tensile strength is frequently imparted to the product by facings. Reflective materials as facings enhance thermal insulating properties. Previously, products have been coated with liquid adhesive on one surface and have had a facing laid over the coated surface to bond it to the product. Liquid adhesives require time for the solvent therein to evaporate in order to set up an effective bond. Liquid adhesives have limited shelf life and are subject to uneven application over the surface area of the product and to inconsistency within the liquid composition itself as from the settling of solids.

Film adhesives having flexibility in the solid state and which become tacky upon heating have been used to bond woven glass cloth to glass fiber mats. A section of mat has been placed within the press with a conforming piece of glass cloth and intermediate layer of film. Pressure is applied to the combination by the press together with heat, and the pressure is sustained until sufficient subsequent cooling has occurred to set the adhesive and establish the bond between the facing of cloth and the mat. More recently, adhesive film has been applied on a continuous basis to bond indefinite lengths of facing material to a substrate.

One of the problems with using adhesive film on a continuous basis arises from the tendency of the film to shrink upon heating unless it is constrained. If the film is not constrained until sufficient cooling has occurred to set the adhesive, the shrinking of the adhesive will produce an uncontrolled and non-uniform bond and variations in the dimensions of the resulting composite. Where foil facing is reinforced with a scrim, the scrim has a selvage which imparts an undesirable pattern to the foil when the two are joined. One approach to stabilizing the scrim material has been to bond it to the foil between the foil and a layer of kraft paper. The foil-skrim-kraft facing was then bonded to substrates by liquid adhesives after the selvage portion of the facing thus formed had been trimmed away. Thus, two layers of adhesive and an additional element, the kraft paper, was required to apply a facing of foil reinforced by skrim to a substrate.

The present article and its method of manufacture has permitted elimination of kraft paper from facings employing skrim reinforcement. It has also simplified the bonding steps employed in forming and applying composite facings. Using an adhesive film to both adhere the scrim to the foil and the facing thus formed to the substrate has resulted in the ability to continuously manufacture a four-layer article in which the film also adds to the toughness of the facing.

SUMMARY OF THE INVENTION

This invention relates to facings, to facing a cured mass of glass fibers with an outer layer, a layer of film adhesive and a layer of scrim intermediate the outer and film layers and more particularly to a facing of foil, glass strand scrim and adhesive film, its method of manufacture and its application by an adhesive bond derived from the film to a cured mass of glass fibers.

The article is manufactured by continuously directing the three layers from coils of material three paths and converging the layers into superposed relationship along a fourth path with the layer of scrim intermediate the outer and film layers. Heat is applied by a hot roll as the layers pass between the hot roll and a pressure roll. The pressure roll applies pressure against the hot roll to cause the layer of film to adhesively bond the layer of scrim to the outer layer by the combination of heat and pressure for a given period of time thereby forming a facing. The mass of glass fiber is directed along a fifth path and converged with the facing along a sixth path. The facing is oriented with the film layer adjacent the mass of glass fibers at which point heat is again applied by the hot roll and pressure by the pressure roll to cause the layer of film to further adhesively bond the facing to the mass.

The product of the above process is an article having a uniform distribution of adhesive with a single adhesive used to bond the elements of the composite facing and to bond the facing to the mass of glass fibers. The single adhesive eliminates an intermediate layer and a layer of adhesive thereby reducing costs. Further, the adhesive film enables the process to be run on a continuous basis to further reduce costs.

DESCRIPTION OF THE PREFERRED EMBODIMENT

Figure 1:
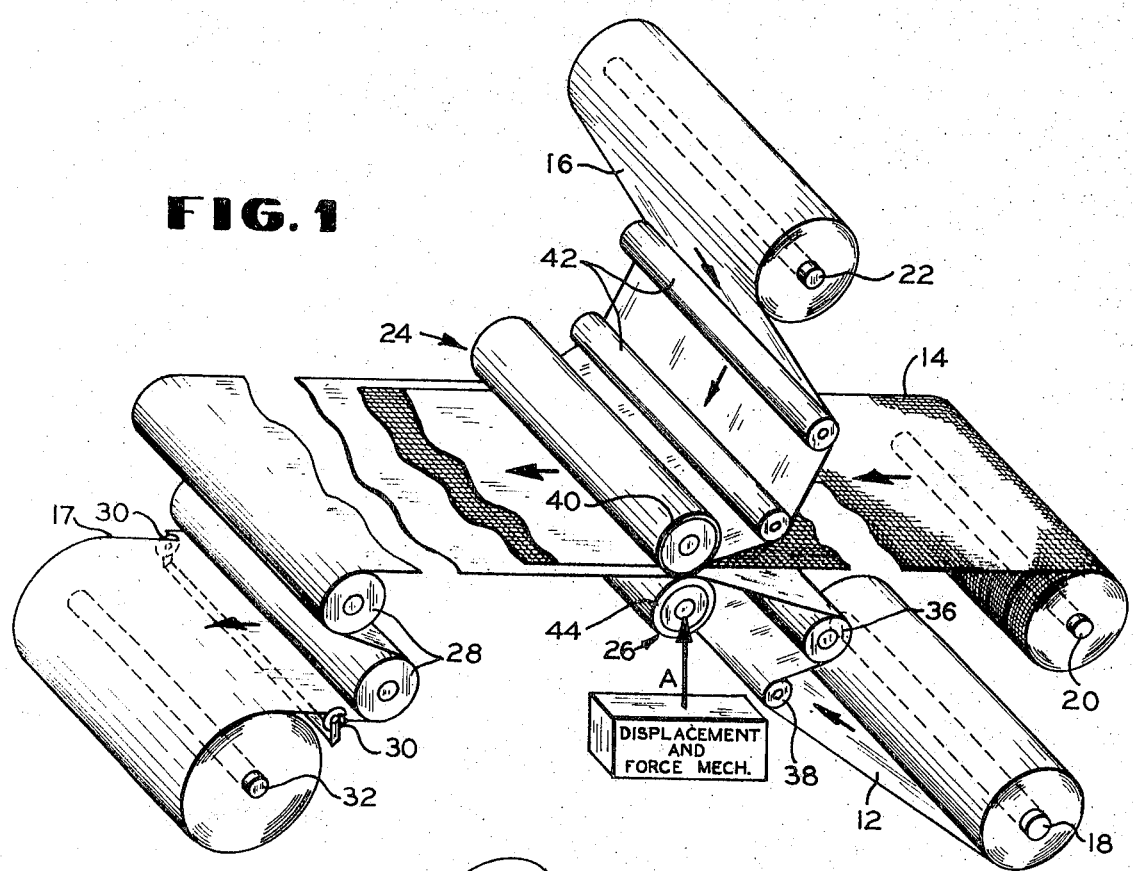
FIG. 1 is a perspective view of a portion of the line equipment and material, illustrated schematically, required to form a facing in accordance with the present invention.
Figure 2:
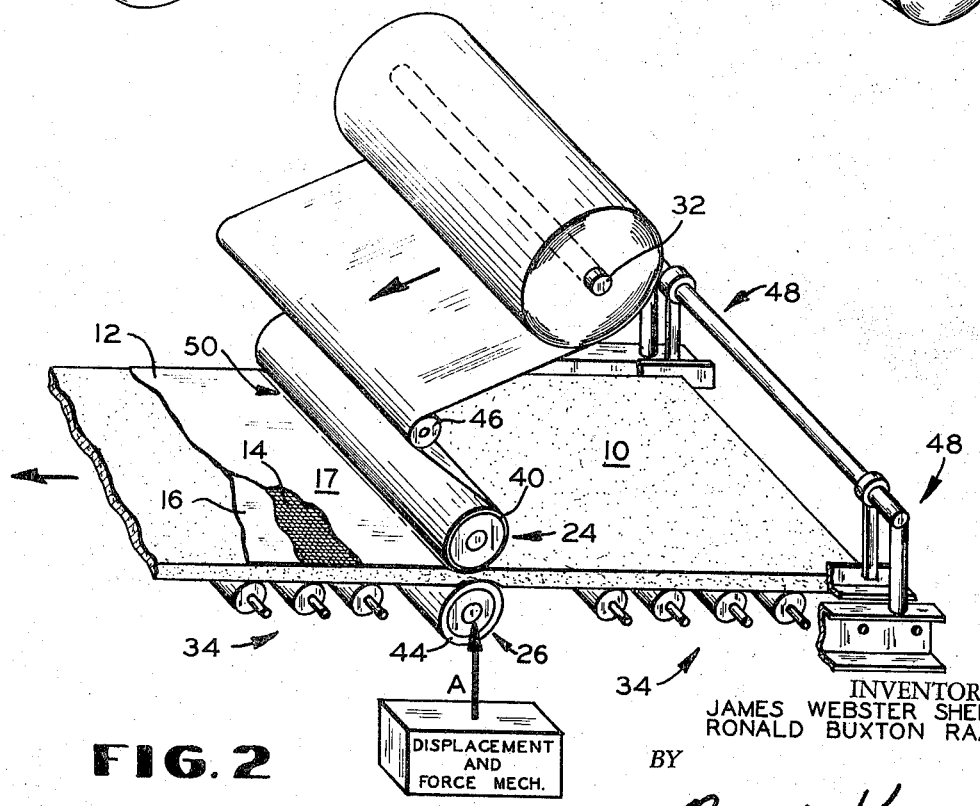
FIG. 2 is a perspective view of further equipment and material, illustrated schematically, forming an article in accordance with the present invention.

Referring to the drawings, FIGS. 1 and 2 illustrate line equipment for manufacturing facing and a substrate faced with the facing. The substrate 10 may be any of a number of materials. In the disclosure which follows a substrate of cured resin bonded glass fibers such as a mat, duct board, batt, or blanket will be considered. The facing has an outer layer which may be a reflective material such as foil 12, an intermediate layer of reinforcing such as scrim 14, and a layer of adhesive film 16. These layers can be fed from coils on mandrel 18, 20, and 22 respectively. The layers 12, 14, and 16 are directed along paths which converge to form the facing at a hot roll 24 where a pressure roll 26 applies pressure to form a bond between the layers 12, 14 and 16. Continuing along, the facing passes over cooling rolls 28 to remove heat from the facing, through a slitter 30 which trims the marginal edges of the facing to remove the selvages of the scrim 14 and is wound upon a windup mandrel 32.

Facing comprised of a composite with an integral, dormant adhesive face 16 can be introduced into trade as a product or stored for further pocessing as a coil on mandrel 32. It also can be combined directly in an in line process with material to be faced as by applying it to that material prior to cooling it to its non-tacky state. In the illustrative embodiment the apparatus for forming the facing is utilized for a second phase application of the facing to a suitable substrate such as glass fiber duct board 10.

Once the facing has been formed by passing the layers 12, 14, and 16 through the line, as illustrated in FIG 1, the line is modified by adding a powered conveyor 34 and by placing the windup mandrel 32 having the coil of facing in a position, illustrated in FIG. 2, to feed the facing material from the coil to the hot roll 24. The conveyor 34 transports the product 10 along a path which converges with the path of the facing at the hot roll 24. Heat and pressure are applied by the hot roll 24 and pressure roll 26 respectively to bond the facing to the product 10. A uniform peripheral speed is maintained on the several rolls engaging the facing and substrate so that the elements are brought together with minimum sheer stress at their interface. Thus, if the faced substrate is to be wound, its windup (not shown) is operated at line speed as are the hot roll 24, pressure roll 26 and cooling roll 28. The final product is one having a facing which has a protective surface with a uniform pattern and scrim reinforcing for added stength.

In the embodiment illustated, the foil 12 is aluminum of approximately 1 mil thickness, the scrim is glass fiber strands in mesh pattern of ¼" square openings and the film is an ethylene acrylic acid copolymer having a thickness of 1.25 mil. As alternatives, other facing materials and thickness can be used including other metals, plastics and other flexible sheet materials. The scrim layer also can be of other materials, for example, other mineral fibers, organic fibers or wire, and of varying sized mesh and different patterns, for example, diamond shaped. A sheet material having openings through which the adhesive can be bonded to the outer layer advantageously employ the concepts of this invention. Further, the film could be of other thermoplastic flexible materials which become tacky when heated, for example, a vinyl and of other thicknesses. While the embodiment illustrated uses the same hot roll 24 for forming the facing and the marriage of facing to the product 10, it will be understood that a second hot roll could be introduced into the line along with a companion pressure roll to form the final product in a single pass through the line.

The foil 12 is illustrated in FIG. 1 as passing over a preheat roll 36 which can be used to preheat the foil, particularly when the foil is below ambient temperature. The directional roll 38 defines a wrap of the foil approach 180° over a face of the preheat roll 36. Foil 12 has a width slightly larger than that of the scrim 14 and film 16 to provide a working margin within which the longitudinal boundaries of the component layers of the facing may contact the foil 12 so that perfect registry of the layers is not required. The greater width of the foil 12 further prevents the film 16 from over-running the foil 12 when the film 16 is heated, thereby protecting the pressure roll 26 from adhesive fouling from contact with the film 16.

The sequence of the layers 12, 14 and 16 is important. The adhesive is most effective when the scrim 14 is intermediate the foil 12 and film 16 while the foil is contacted by the pressure roll 26 and the film 16 is contacted by the hot roll 24. Inverting the sequence of the layers 12, 14 and 16 illustrated would require inverting of the pressure and hot rolls 26 and 24 also.

The hot roll 24 is made of steel having an 11½ inch diameter polished face with Teflon tape 40 wrapped about the face. Heat is furnished to the roll 24 by circulating hot oil through the hollow interior of the roll 24. Transfer of the heat from the hot roll 24 to the film occurs upon contact of the film with the roll 24 causing a softening of the film whereby it becomes tacky. In the tacky state, the film 16 becomes an active adhesive for joining the scrim 14 to the foil 12. The hot roll is covered with Teflon tape 40 to prevent the softened and tacky film 16 from sticking to the face of the hot roll 24. Directional rolls 42 direct the film 16 to the hot roll 24 at a low angle approaching tangential contact, or zero wrap of the film about the roll 24, to prevent preheating of the film 16. The adverse effects of the inherent mechanical instability of the film at temperatures sufficient to render the film tacky are minimized by limiting heating to that period the film is backed by supporting and stabilizing layers 12 and 14.

Bonding of the layers 12, 14 and 16 required pressure in addition to heat. The pressure is provided by the pressure roll 26 which can be a steel roll having a rubber facing 44 of 40 durometer. As indicated schematically by the arrow A, the pressure roll 26 is mounted on mechanism which allows it to be displaced with respect to the hot roll 24 and with provisions for applying force to the roll 26. Any suitable conventional means may be used for the mounting mechanism, for example, screw type takeup blocks slidable along a line passing normally through the axes of the rolls 24 and 26 on which the pressure roll 24 is journaled.

The directional roll 42 preceding the hot roll 24 may also be contoured on its face by a central crown to impart a spreading or expansive action to the film 16 to remove any wrinkles before contacting the hot roll 24.

The rubber facing 44 on the pressure roll 26 has an elasticity which allows the hot roll 24 to deflect the facing of the pressure roll 26 at the point of contact between the two rolls resulting in something more than line contact between the surfaces of the rolls 24 and 26 when sufficient pressure is applied by the pressure roll. The more the rubber facing 44 conforms to the shape of the hot oll 24 at the point of deflection, the greater will be the area of contact between the rolls 24 and 26. Thus, when the layers 12, 14. and 16 are passed between the rolls 24 and 26 the maximum pressure available is applied by the pressure roll 26 to obtain the greatest area of contact between the layers 12, 14 and 16 at the point of bonding.

Bond development for a given film is a function of temperature, pressure and time. In the example, the bond of the scrim to the aluminum foil outer layer occurs at the points of contact of the tacky heated film with the foil through the interstices of the scrim. The bond is accomplished with a maximum pressure of the order of 5 to 50 pounds per square inch, the hot roll 24 heated to from 350° F. to 600° F., and the line speed is 20 to 125 feet per minute.

At the point of bonding, the scrim 14 is partially embedded, along with the foil 12 it contacts, in the rubber facing 44 of the pressure roll 26. The portion of foil 12 covering the open area bound by the scrim 14 is in effect pushed into the open areas by the rubber facing 44 when the scrim 14 is embedded therein. Simultaneously, the film 16 is softened by heat from the hot roll 24 and is displaced into the open areas bounded by the scrim 14 without disrupting the film continuity. The result is a facing in which the scrim 14 is indented into both the film 16 and foil 12 and the film and foil intimately surround the individual strands of scrim 14. Surrounding of the strands of scrim 14 further results in the film 16 and foil 12 achieving contact over nearly 100% of the open area bound by the scrim 14 to form a strong uniform bond between them. Further, bonding also occurs between the film 16 and the scrim 14. Thus, a requisite intermediate product with a three-ply facing 17 has been developed for application on the substrate 10 to be covered.

The laminated facing 17 passes over the cooling rolls 28 to remove residual heat in the facing resulting from the bonding process to cool the film below its tacky temperature, dimensionally to stabilize the film, and to facilitate manipulation of the facing without adherence of the film to the equipment or superposed layers. Subsequently, the marginal edges of the facing are trimmed in the slitter 30 to remove the excess foil 12 and the scrim 14 selvages. The selvage is no longer needed since the scrim 14 is now securely stabilized between the film 16 and foil 12. A windup mandrel 32 is provided to gather the facing 17 into a coil. Alternatively, the facing 17 can be applied to the substrate 10 by engaging it therewith in the line at this point.

In FIG. 2 the line is illustrated in condition for applying the facing on mandrel 32 to the substrate 10, a high density glass fiber board, supported on the conveyor 34 which moves the product 10 along a path to converge with the path of the facing. A directional roll 46 engages the facing 17 intermediate the mandrel 32 and the hot roll 24 to cause the facing to wrap the hot roll 24 over a peripheral portion approaching 180° of wrap. This substantial wrap of the hot roll 24 can be employed because the film 16 now is stabilized by the remainder of the facing as it is softened by the heat of the hot roll 24. At the same time, the large wrap of the hot roll 24 provides a substantial area of contact between the facing and the hot roll 24 to transfer heat from the roll 24 through the foil 12 contacting the roll 24 to the film 16 to be softened. With the foil 12 in contact with the face of the hot roll 24, the opposing film 16 is exposed for contact with the board 10 passing between the hot roll 24 and the pressure roll 26.

The substrate 10 is maintained in registry with the facing by adjustable guides 48 supported from the conveyor 34 and movable transverse of the conveyor 34. The guides 48 are adjusted to accommodate the specific width of the substrate 10 being processed. Any width of substrate equal to or less than the width of the rolls 24 and 26 may be processed with a suitable width of facing. The substrate may be furnished in indefinite lengths and subsequently be cut to desired lengths or provided in precut lengths and delivered with the lengths in tandem and substantially butted end to end. The facing is subsequently severed between lengths.

As the substrate passes beneath the hot roll 24 about which the facing is wrapped with its outer or foil surface in engagement with the roll, the exposed film 16 in the softened and tacky state is brought into contact with the adjacent substrate while pressure is applied to both the facing and the substrate 10 by the pressure roll 26. FIG. 2 illustrates the indentation of the rolls 24 and 26 upon the substrate 10 which may compress the substrate as much as 50% of its thickness. The indentation of the hot roll 24 at 50 increases the area of contact between the facing and the substrate 10. The larger area provides for greater bonding area under which and a greater time interval during which the film is maintained under pressure in the heated state. Bonding of the facing to the substrate, as in the case of the bond of the film 16 to the foil 12 and scrim 14, is a function of time, pressure, and temperature. The time is governed by the speed of the line and the length of circumferential contact with the heat and pressure applying means. Thus, with the exemplary foil-scrim-film facing wrapped essentially 180° around the hot roll 40 an effective laminated structure of faced glass fiber duct board of 3 to 8 pound per cubic foot density and ½ to 2 inches thick is formed at a rate of 10 to 50 feet per minute with a hot roll at 300° to 500° F. and a pressure of 5 to 20 pounds per square inch of hot roll contact in region 50. For a given board, speed is directly related to pressure and temperature. Pressure is limited by the required recovery of the board. Temperature is limited by the tolerance of the film and board binders.

The process is not limited to the use of opposing rolls, rather, any means for applying the proper heat and pressure on a continuous moving product may be used, for example, a combination roll for applying heat and pressure may be used with an opposing conveyor.

It should be noted that the product 10 leaving the rolls 24 and 26 is covered with a facing bonded to it between the rolls 24 and 26 by a film 16 of adhesive which was also used to adhesively bond the scrim 14 to the foil 12 of the facing. Thus one film 16 of an adhesive nature is used to form two adhesive bonds at different points in time.

The article resulting from facing a mass of glass fibers using a film adhesive as one layer of a three-layer facing has a very uniform distribution of adhesive. This uniform distribution results in greater adherence between the facing layers and the facing to the mass of glass fibers. Since the bonded film is tough and maintains its integrity, it affords an auxiliary vapor barrier. Further, the facing itself, and the combination of the product and facing which is applied to it have an increased tensile strength over non-film adhesive. A single adhesive bonds the layers of the facing together and also bonds the facing to the product. The two bonds derived from one adhesive application eliminates the need for additional layers in forming the facing. The elimination of a layer of material and a layer of adhesive as well as the step required to apply the material results in substantial cost savings.

In view of the variations in materials and process steps embodying the invention and the wide range of their utilization, it should be understood that the above disclosure is merely illustrative and should not be read in a limiting sense. The invention may be practiced otherwise than as specifically illustrated and described without departing from its spirit or scope.

We claim:
1. An article comprising:
 a substrate of bonded glass fibers;
 a foil facing outer layer;
 an intermediate sheet of scrim material having a pattern of openings distributed over its surface and located between said outer layer and said substrate; and
 a thermoplastic film sheet having adhesive properties located between said outer layer and said substrate and bonded to said outer layer, said substrate and said intermediate sheet directly, said film bonding said outer layer and said substrate through said openings of said intermediate sheet of material.

References Cited
UNITED STATES PATENTS

| | | | |
|---|---|---|---|
| 3,444,024 | 5/1969 | Hillas | 161—89 X |
| 3,647,061 | 3/1972 | Kaupin | 161—89 X |
| 3,393,117 | 7/1968 | Zolg et al. | 161—93 X |
| 3,664,907 | 5/1972 | Price | 161—93 X |
| 3,038,811 | 6/1962 | Reading | 161—113 X |

GEORGE F. LESMES, Primary Examiner

P. J. THIBODEAU, Assistant Examiner

U.S. Cl. X.R.

156—309; 161—93, 94, 98, 113, 203, 216